United States Patent [19]

Zalesky

[11] 3,963,501

[45] June 15, 1976

[54] PROCESS FOR PREPARING ANTI-MIST COMPOUNDS FOR PRINTING INKS AND PROCESS FOR PREPARING PRINTING INKS CONTAINING SAME

[75] Inventor: Norbert G. Zalesky, Cornwells Heights, Pa.

[73] Assignee: Garlock Inc., Palmyra, N.Y.

[22] Filed: July 30, 1974

[21] Appl. No.: 493,097

[52] U.S. Cl. .................................. 106/20; 106/23; 106/28; 106/261; 106/308 F; 106/308 N; 106/309; 260/37 R; 106/287 S; 106/308 Q

[51] Int. Cl.² ............... C09D 11/00; C09D 11/06; C09D 11/10

[58] Field of Search ............... 106/2, 20, 22, 23-, 106/32, 261, 288 Q, 308 Q, 308 F, 308 N, 309; 260/37 R

[56] References Cited
UNITED STATES PATENTS

| | | | |
|---|---|---|---|
| 1,553,914 | 9/1925 | Rhodes | 106/30 X |
| 2,142,667 | 1/1939 | Bucy | 106/2 X |
| 2,354,979 | 8/1944 | Almy | 106/2 |
| 2,739,067 | 3/1956 | Ratcliffe | 106/30 |
| 2,866,711 | 12/1958 | Hart | 106/22 |
| 3,015,632 | 1/1962 | Remer | 106/22 |
| 3,547,669 | 12/1970 | Battista | 106/272 |
| 3,838,085 | 9/1974 | Myers et al. | 106/288 B X |
| 3,849,143 | 11/1974 | Hubbard | 106/22 |

*Primary Examiner*—Joan E. Welcome
*Attorney, Agent, or Firm*—Woodcock Washburn Kurtz & Mackiewicz

[57] ABSTRACT

Anti-mist compounds adapted to inhibit the misting tendencies of printing inks on high speed printing presses are prepared by mixing chrysotile particles having an average particle size exceeding about 0.01 inch and preferably ranging from 0.1 inch to about 0.5 inch, with a printing ink vehicle to provide a mixture in which the particles of chrysotile are wetted by the vehicle and which preferably contains above about 20% by weight of chrysotile. The mixture is sheared, as on a three roller mill for example, to grind the chrysotile into micro-fibrous particles and to distribute the micro-fibrous particles uniformly throughout the vehicle. By employing chrysotile particles having the aforesaid particle size range, workable compound mixtures containing 35% or more by weight of chrysotile may be obtained. The compound mixtures produced are useful to inhibit the misting tendencies of printing inks without causing flatting or emulsification of the ink, and without appreciably affecting ink viscosity.

12 Claims, No Drawings

3,963,501

PROCESS FOR PREPARING ANTI-MIST COMPOUNDS FOR PRINTING INKS AND PROCESS FOR PREPARING PRINTING INKS CONTAINING SAME

BACKGROUND OF THE INVENTION

1. Field of the Invention

This invention relates to anti-mist compounds for printing inks and to the production of printing inks having inhibited misting tendencies when used on high speed printing presses.

2. Description of the Prior Art

The speed of printing presses has increased over the years such that web speeds exceeding 1200 feet per minute are common practice. Such high speeds have caused an increasing problem in the press room from ink which leaves the running presses in the form of a very fine spray or mist of ink which is thrown off by the fast moving rollers of the high speed press and which coats everything in the vicinity of the press with a sticky layer of ink.

Numerous efforts have been made to alleviate the misting problem and to provide printing inks which are capable of operation on high speed presses with little or no misting. Wolfe, *Printing and Litho Inks*, p. 270, 6th ed. (1967) states that ink flying or misting may be controlled in some measure by increasing the viscosity of the ink vehicle and by incorporating water and emulsifying agents in the ink to render it conducting. In addition, Wolfe suggests that by strongly ionizing the atmosphere in the vicinity of the rapidly revolving rollers the misting tendencies can be reduced. He acknowledges, however, that at very high press speeds even these measures are only partially successful. The addition of bentonite to printing ink as an anti-mist additive is suggested in U.S. Pat. Nos. 2,754,219 – Voet et al, 2,739,067 – Ratcliffe, 2,750,296 – Curado et al, and 2,766,127 – Voet. U.S. Pat. No. 3,015,632 – Remer suggests the incorporation of cationic amines or amides into ink to reduce the misting tendencies thereof.

U.S. Pat. No. 37,984 – Smillie discloses the use of a mixture of about 2 parts by weight of a powdered chromium compound and 1 part by weight of powdered asbestos to provide the basis for a green ink which is said to reduce the wear of plates or other printing surfaces on which green ink is commonly used. U.S. Pat. No. 1,553,914 – Rhodes describes the production of a paint or printer's ink solvent including the double silicate of magnesium and nickel. Neither the Smillie nor Rhodes patents are concerned with the problem of misting, however.

In general, the prior art attempts to solve the misting of inks have not been entirely successful since the anti-mist additives have been only partially effective and have generally resulted in a flatting and emulsification of the ink.

SUMMARY OF THE INVENTION

Briefly stated, the present invention contemplates the production of an anti-mist compound adapted for addition to a printing ink to inhibit the misting of the printing ink on a printing press. In accordance with one form of the invention chrysotile particles having an average particle size exceeding about 0.01 inch are mixed with a printing ink vehicle to provide a mixture in which the chrysotile particles are wetted with the vehicle. The mixture is then subjected to shearing forces to grind the chrysotile particles into micro-fibrous particles and to disperse the micro-fibrous particles uniformly throughout the vehicle to provide the desired anti-mist compound.

The term "vehicle" as used herein means that component, or mixture of two or more components, which serves as the dispersing and carrying medium for the pigment particles of the printing ink and which also imparts most of the necessary rheological properties, such for example as plasticity, flow, etc., to the printing ink. It is thus the vehicle which carries the pigment particles through the various distributing mechanisms of the printing press on which the ink is used, and which enables the ink to transfer properly to paper or other surface to be printed. The vehicle may be any of the well known organic oils, varnishes, resins and plasticizers used in the production of printing inks, such as, for example, disclosed in Wolfe, *Printing and Litho Inks*, Chapter III, pp. 43–74, 6th ed. (1967) whose disclosure, by reference, is herein incorporated as part of the teaching of the present specification. The vehicle is often called the "base vehicle" and may contain a mixture of various components. See, e.g. U.S. Pat. Nos. 3,361,582 – Lewis and 3,015,632 – Remer which are illustrative of the types of vehicles useful in the practice of the invention.

In the conventional method of compounding printing inks, an oil or resin which serves as the vehicle is mixed with the desired pigment resulting in an ink of the desired type and color. As known to those skilled in the art, not all vehicles can be employed with any and all pigments, and a careful selection must be made between pigment and vehicle in order to assure an ink of the desired type and color. Similarly, when compounding other materials with a particular printing ink, including a combination of vehicle and pigment, the additive compound must be compatible with the base vehicle of which the printing ink is formed. Accordingly, in the production of the anti-mist compounds of the invention, it will be appreciated that vehicles will be selected which are the same as or compatible with the base vehicle of the printing ink to which the anti-mist compound is to be added. Selection of a suitable vehicle for the production of the anti-mist compound in accordance with the invention will therefore be governed by the type of ink to which the compound is to be added in order to impart the anti-mist characteristics to the ink.

It has been unexpectedly discovered that the size of the chrysotile particles initially employed to provide the anti-mist compounds of the invention is critical to attain maximum loading of the chrysotile while retaining the desired "workability" of a compound mixture. In this connection, it has been found that the use of powdered, micro-fibrous chrysotile is, for practical purposes, useless in the production of anti-mist compounds for two reasons: first, the handling of chrysotile, which is a form of asbestos, in finely divided powdered form will generally result in dusting which presents a potential health hazard. Second, the amount of powdered chrysotile which can be loaded into conventional base vehicles, such as alkyd varnishes for example, is limited to about 20%, i.e. the resulting compound mixtures of powdered chrysotile and vehicle will, at levels above about 20% by weight of chrysotile, become very viscous and lose their workability. As will be appreciated by those skilled in the art, the desideratum of any anti-mist technique involving the use of an anti-mist additive is to add the least amount of additive to obtain the desired anti-misting properties in order to minimize the possible side-effects that the additive may have on the ink formulation. Thus, to the extent that the concentration of the active anti-mist component in the compound can be increased, the less compound will be necessary to obtain the desired result.

In accordance with the invention, it has been discovered that by using chrysotile particles having an average size of about 0.01 inch, and preferably from 0.1 inch to about 0.5 inch or less, workable compound mixtures may be obtained including as much as 25%, and as high as 40%, by weight of chrysotile. In addition, use of the chrysotile particles or pellets of the foregoing size diminishes the undesirable dusting problems at the point of mixing so that the chrysotile can be used within the standards designated as safe by OSHA. In general, chrysotile pellets having sizes ranging from about 0.1 inch to about 0.25 inch, and up to 0.5 inch are preferred in the practice of the invention.

In accordance with the invention, the anti-mist compounds are prepared by mixing the chrysotile particles or pellets having the desired particle size with a suitable printing ink vehicle. Among the printing ink vehicles which may be used are the alkyd varnishes, the rubber based vehicles for rubber based printing inks, as well as urethane varnishes. Generally speaking, the printing ink vehicles will be organic liquid vehicles and will be classified into one of three categories, i.e., linseed varnishes, alkyd varnishes and urethane varnishes. The ink vehicle selected must as noted above, be compatible with the ink with which it is to be combined. Accordingly, the use of the same vehicle as that used in the preparation of the printing ink, or a vehicle which is compatible with the printing ink with which the anti-mist compound is to be blended, should be used. Generally speaking, the printing ink vehicles used in the production of the anti-mist compounds of the invention will preferably be characterized by an absolute viscosity of from about 10 to about 110 poises at 25°C. Where lithographic or alkyd varnishes are used, such for example as described in the aforesaid Wolfe text, varnishes characterized by varnish numbers ranging from between about 3 and about 5 may be employed. In this connection it has been found that workable compound mixtures can be obtained with chrysotile-varnish combinations containing 35% by weight of chrysotile and 65% by weight of a number 5 varnish. Comparative viscosities of common varnish vehicles in terms of lithographic varnish numbers is reported at page 48 of the aforesaid Wolfe text.

The mixing of the chrysotile particles or pellets of the desired size with the vehicle may be accomplished with the aid of any of the well-known mixing devices used in the printing industry, such as the three roll mill which is preferred. It has been found that the passing of the mixture through the roll mill two or more times will assure the necessary grinding of the particulate chrysotile into micro-fibrous particles having sizes of the order of 10 microns or less, and the uniform distribution of the particles throughout the vehicle. Generally speaking, the anti-mist compounds of the invention will contain at least 25%, and as high as 40% by weight of chrysotile, the balance being the ink vehicle.

A printing ink whose anti-mist characteristics may be improved in accordance with the invention may be prepared by any of the mixing methods commonly used in the printing ink industry. For example, the ink vehicle may be mixed with a dry pigment normally utilized as the coloring material and the chrysotile incorporated into the ink in the form of an anti-mist compound prepared in accordance with the invention and comprising the chrysotile dispersed in the same vehicle, or in one compatible with the ink with which the anti-mist compound is to be mixed. The usual methods of mixing and milling as for example with the aid of the well-known three roll mill or ball mill may be employed. In order to attain the advantageous results of the present invention, it is necessary that the chrysotile content of the final printing ink range from about 1% to about 3%, and preferably from about 1.5% to about 2% based upon the weight of the finished ink. When the chrysotile-containing compound of the invention is added to the ink in the foregoing amounts, the resulting ink exhibits a greatly reduced tendency to mist when used in high speed web press operations. Moreover, the addition of the chrysotile-containing compound of the invention to provide inks where chrysotile content varies within the foregoing range does not materially affect the body, length or flow characteristics of the ink, nor does it cause flatting of the ink or contribute to its emulsification.

In order that those skilled in the art may better understand how the present invention may be practiced the following example is given by way of illustration and without limitation. All parts and percentages are by weight except as otherwise noted.

EXAMPLE 65 parts by weight of an alkyd varnish having a varnish number of 3 (alkyd "9903" manufactured by Superior Varnish Company) were added to a mixing vessel to which 35 parts by weight of chrysotile pellets were added having particle size ranging from about 0.1 inch to about 0.25 inch. The chrysotile pellets were pelletized chrysotile asbestos sold by Union Carbide Corporation under the trade designation "RG-100 Calidria Asbestos." The mixture was stirred thoroughly to assure that all of the chrysotile pellets were wetted by the alkyd varnish and the mixture was applied to a three roller mill and passed through the mill twice. The resulting compound mixture was then tested for fineness over a fineness-grind gauge (manufactured by Precision Gauge and Tool Company of Dayton, Ohio). A gauge reading of 8 was obtained indicating that no scratches were visibly seen on the fineness gauge until a reading of 8 had been attained. This signified that the solids in the material tested had a particle size ranging of from about 2 to about 10 microns. Normally, printing inks are generally acceptable when they have a reading on the fineness-grind gauge of between 8 and 9.

Five parts by weight of the chrysotile-alkyd varnish compound mixture were mixed with 95 parts by weight of a standard rubber-based black ink. The control, the black ink without the asbestos additive, was then placed on a Thwing-Albert Inkometer which was run at 2,000 rpm. A flat sheet of white stock was placed within 1½ inches from the roller behind the inkometer which was run for 2 minutes. This same procedure was followed with the ink prepared in accordance with the invention, i.e., including 5 parts by weight of the chrysotile-containing alkyd varnish.

The results showed a significant improvement in anti-misting qualities in the ink containing the chrysotile additive. More particularly, the misting was practically eliminated from the ink which contained the chrysotile additive. It was estimated that 95% of the misting had been eliminated by the addition of the anti-mist compound to the ink, as evidenced by the amount of misting displayed on the white stock cards which were positioned behind the inkometers during the test.

Inkometer readings were taken of both the control as well as the composition prepared in accordance with the invention i.e., the ink containing the chrysotile additive. Both readings were 12.5, which indicated that the viscosity was the same for both inks. This signified that the addition of the very minor amount of the chrysotile additive did not affect the ink viscosity.

The foregoing test was considered to be a most critical one from the standpoint of misting since rubber-based inks are well known to be naturally misting inks. Other inks would not be so susceptible to misting as a rubber-based ink.

As will be appreciated by those skilled in the art, the present invention affords a significant improvement in the production of anti-mist compounds and in methods for inhibiting the misting of printing inks. The conventional anti-mist additives heretofore used, such as bentonite, silicas and calcium carbonate have generally diminished the gloss of the ink and have contributed to ink emulsification. On the other hand, the compositions of the present invention, when added to printing inks, do not result in any flatting of the ink nor in emulsification. In addition, use of the anti-mist compositions of the invention in amounts sufficient to inhibit the misting tendencies of ink will not affect ink viscosity or otherwise materially affect the desired properties of the ink formulation.

While the present invention has been described in considerable detail with respect to certain specific embodiments thereof, it is to be understood that it is not to be limited to those embodiments, but may be used in other ways without departure from the spirit of the invention or the scope of the appended claims.

What is claimed is:

1. A process for producing an anti-mist compound adapted for addition to a printing ink to inhibit the misting of said printing ink on a printing press, which comprises:

mixing chrysotile particles having an average size exceeding about 0.1 inch with an organic printing ink vehicle to provide a mixture in which said particles are wetted with said vehicle, and milling said mixture simultaneously to grind said particles into micro-fibrous particles having a particle size of 10 microns or less and to disperse said micro-fibrous particles uniformly throughout said vehicle to provide an anti-mist compound including at least 25% by weight of chrysotile.

2. The process of claim 1 in which the chrysotile particles which are mixed with said vehicle initially have an average particle size of up to about 0.5 inch.

3. The process of claim 1 in which said micro-fibrous particles of chrysotile comprise up to about 35% by weight of said anti-mist compound.

4. The process of claim 1 in which the chrysotile particles which are mixed with said vehicle initially have an average particle size ranging from about 0.1 to about 0.25 inch.

5. The process of claim 1 in which said printing ink vehicle is characterized by an absolute viscosity of from about 10 to about 110 poises at 25°C.

6. The process of claim 1 in which said chrysotile particles have an average particle size of from about 0.1 inch to about 0.25 inch and are admixed with a printing ink vehicle characterized by an absolute viscosity of from about 10 to about 110 poises at 25°C. to provide an anti-mist compound comprising at least 25% by weight of chrysotile.

7. The process of improving the anti-mist characteristics of a printing ink which comprises:

mixing with said printing ink an anti-mist compound in an amount sufficient to inhibit the misting of said ink, said anti-mist compound formed by mixing chrysotile particles having an average size exceeding 0.1 inch with an organic printing ink vehicle compatible with said printing ink to provide a mixture in which said particles are wetted with said vehicle, and milling said mixture simultaneously to grind said particles into micro-fibrous particles having a particle size of 10 microns or less and to disperse said micro-fibrous particles uniformly throughout said vehicle.

8. A process for improving the anti-mist characteristics of a printing ink comprising a coloring agent dispersed in a printing ink vehicle, which comprises:

mixing chrysotile particles having an average particle size exceeding about 0.1 inch with an organic vehicle compatible with said printing ink to provide a compound mixture in which said chrysotile particles are wetted with said vehicle, milling said mixture simultaneously to grind said chrysotile particles into micro-fibrous particles having a particle size of 10 microns or less and to disperse said micro-fibrous particles uniformly throughout said organic vehicle to provide an anti-mist compound including at least about 20% by weight of said chrysotile, and dispersing said anti-mist compound into said printing ink in an amount sufficient to inhibit the misting of said ink on a printing press, the weight of said chrysotile not exceeding about 3% by weight of said ink.

9. The process of claim 8 in which said chrysotile particles which are mixed with said organic vehicle initially have an average particle size up to about 0.5 inch.

10. The process of claim 8 in which said chrysotile particles which are mixed with said organic vehicle initially have an average particle size from about 0.1 inch to about 0.25 inch.

11. The process of claim 8 in which said organic vehicle is characterized by an absolute viscosity of from about 10 to about 110 poises at 25°C.

12. The process of claim 8 wherein said chrysotile particles which are mixed with said organic vehicle initially have an average particle size of from about 0.1 inch to about 0.25 inch and said organic vehicle is characterized by an absolute viscosity of from about 10 to about 110 poises at 25°C. to provide a compound mixture containing at least 25% by weight of said chrysotile.

* * * * *